May 26, 1953 — J. K. SHANNON ET AL — 2,639,824
BATTERY SEPARATOR DISPENSING MECHANISM
Filed June 8, 1949 — 2 Sheets-Sheet 1

INVENTORS
JOHN K. SHANNON
ROBERT R. SCHMIT
BY
ATTORNEYS

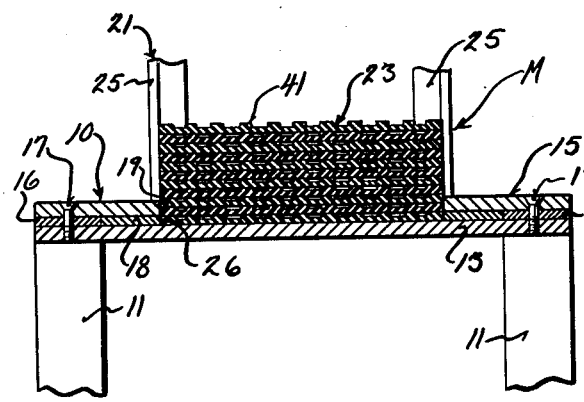
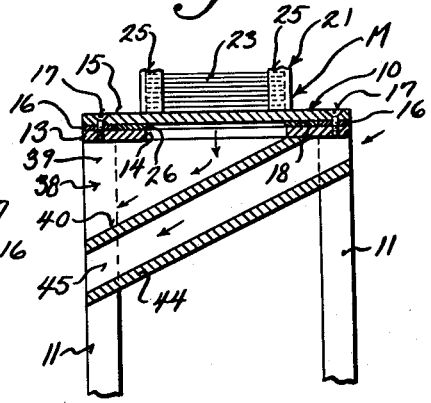
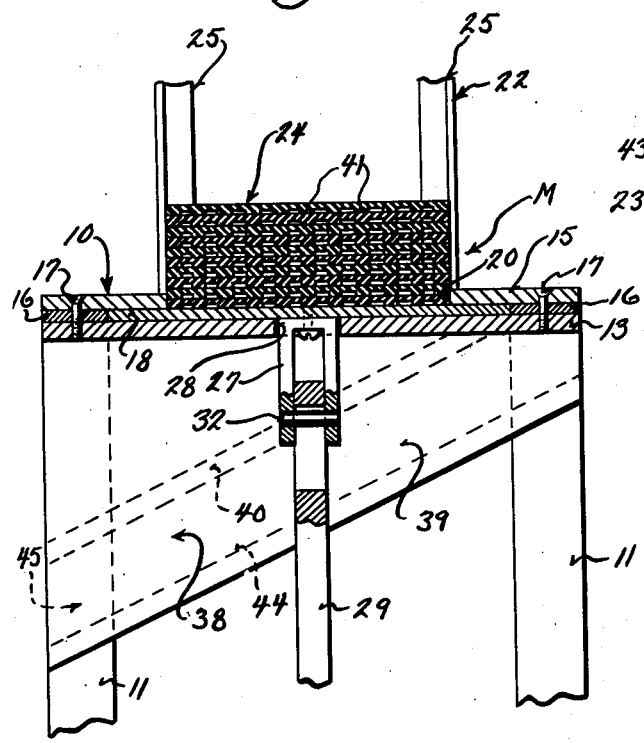
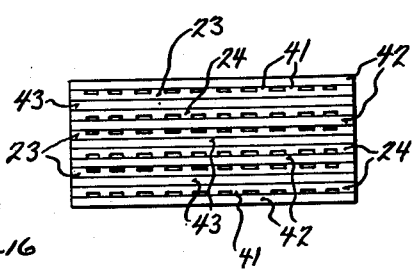
INVENTORS
JOHN K. SHANNON
ROBERT R. SCHMIT Patented May 26, 1953

2,639,824

UNITED STATES PATENT OFFICE 2,639,824

BATTERY SEPARATOR DISPENSING MECHANISM

John K. Shannon and Robert R. Schmit, Kenosha, Wis.

Application June 8, 1949, Serial No. 97,719

1 Claim. (Cl. 214—8.5)

This invention appertains to a novel device for dispensing battery separators in proper order incident to the building of storage batteries.

One of the primary objects of the invention is to provide a simple and economical device for dispensing storage battery separators one at a time, at a fairly constant rate of speed and in such a manner that the separators upon being dispensed are in a proper position so that a machine or an operator can place storage battery plates against the separators forming a stack of alternate plates and separators.

Another salient object of the invention is to provide a machine embodying a novel and simple mechanism for dispensing the separators one at a time from two independent stacks of separators, so that as the separators are dispensed one at a time, they come out of the machine with the ribs of the separators facing in opposite directions alternately so that an operator may readily place a storage battery plate to be positively charged against the rib side of the separator as it is dispensed and a storage battery plate to be negatively charged against the smooth side of the next separator dispensed and thereby permit the forming of a stack of alternate plates and separators with the rib side of the separators against the positive plate and the smooth side against the negative plates.

A further object of the invention is the provision of a delivery chute in which the separators from the two stacks are alternately delivered, the chute construction being such that additional material such as a glass mat can be delivered to the operator between the separators and plates, thus making it possible to quickly and conveniently stack separators, glass mats or similar material, and battery plates in proper sequence.

A still further object of the invention is to provide a novel machine of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described and claimed and illustrated in the accompanying drawings, in which drawings, Figure 1 is a longitudinal sectional view through the machine taken on the line 1—1 of Figure 2, looking in the direction of the arrows.

Figure 3 is an enlarged detail fragmentary transverse sectional view taken on the line 3—3 of Figure 1, looking in the direction of the arrows, and illustrating the position of the separators in one stack or hopper.

Figure 4 is a sectional view similar to Figure 3, but taken on the line 4—4 of Figure 1, looking in the direction of the arrows, and illustrating the position of the stack of separators in the other hopper.

Figure 5 is a transverse sectional view taken on the line 5—5 of Figure 1, looking in the direction of the arrows illustrating the dispensing chute, the figure being taken on the same scale as Figures 1 and 2.

Figure 6 is a side elevational view illustrating a stack or group of battery plates and separators arranged in proper sequence.

Figure 1:
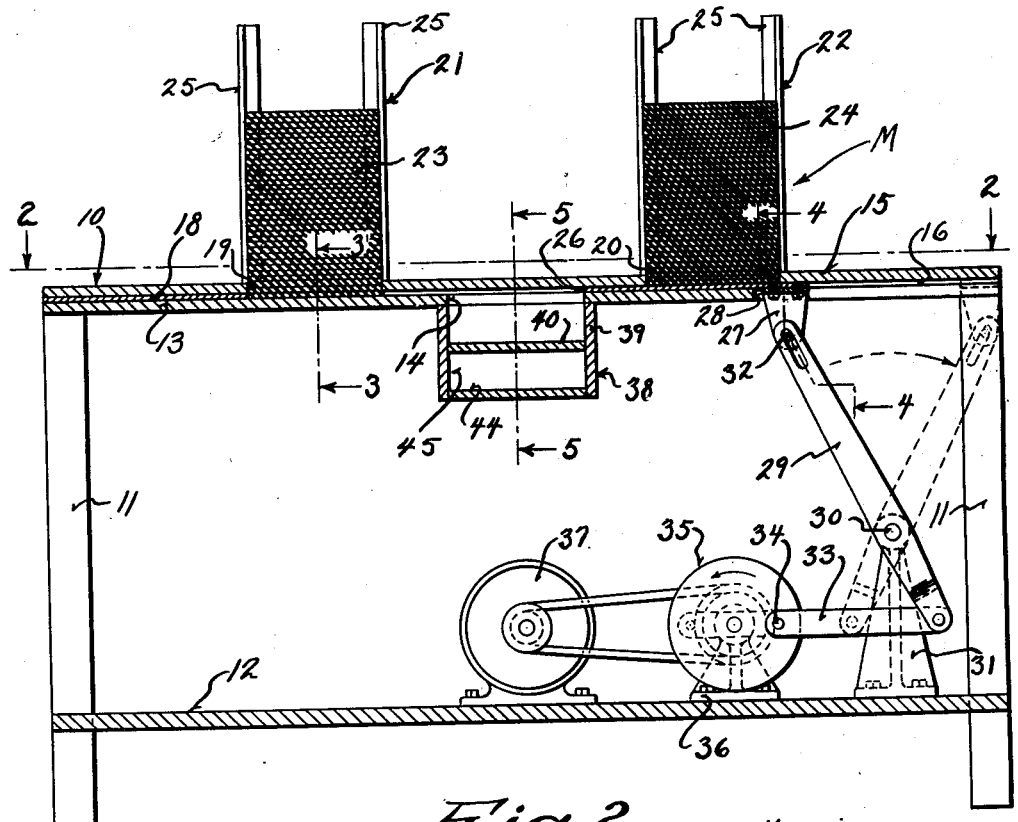

Referring to the drawings in detail, wherein similar reference characters designate corresponding parts throughout the several views, the letter M generally indicates the novel machine for facilitating the delivery or dispensing of battery separator plates in proper sequence. The machine M includes a table top, 10, supported in a desired elevated horizontal plane by corner standards or legs 11. The legs and top can be braced in any preferred way, such as by a shelf or platform 12, which supports certain operating parts of the machine, as will later appear.

The table top 10 is constructed in a novel and special manner and includes a lower plate 13 having a smooth upper face and a centrally disposed dispensing opening 14. Arranged above and slightly spaced from the lower plate 13 is an upper stationary plate 15. The plate 15 is arranged in juxtaposition relative to the plate 13 and is held in the correct spaced position thereto by longitudinally extending front and rear parallel separator straps 16. The plates 13 and 15 and straps 16 are rigidly united by suitable fastening elements 17 and the straps 16 in conjunction with the plates 13 and 15, form a guideway for slidably receiving the reciprocatory dispensing shuttle plate 18. The plate 15 has formed therein, dispensing openings 19 and 20 and these openings are located on the opposite sides of the opening 14 and are equally spaced therefrom.

The upper plate 15 supports dispensing hoppers 21 and 22 for battery separators 23 and 24. The hoppers are arranged directly above the openings 19 and 20, so that the separators 23 and 24 can drop through the openings 19 and 20.

The hoppers 21 and 22 can take various forms, and as illustrated, the same can merely consist of corner uprights 25 formed from angle iron.

The openings 19, 20 and 14 are of a dimension slightly larger than the length and width of the battery separators 23 and 24 to be dispensed, so that the separators will readily fall through said openings.

The shuttle plate 18, is of a thickness substantially equal to the thickness of a battery separator and the space between the plates 13 and 15 is substantially equal to the thickness of a battery separator. Hence, only one separator plate at a time can fall through the openings 19 and 20. The shuttle plate 18 has formed therein an opening 26, which is slightly wider than the dimension from the front to back edges of the openings 19 and 20 in the plate 15.

The shuttle plate 18 is reciprocated back and forth from one hopper 21 to the other hopper 22, and the length of the opening 26, is such that when the plate is moved back and forth, the end walls of the opening will be just far enough past the outer sides of the hoppers to allow one separator 23 or 24, as the case may be, to fall into the opening 26. Obviously, the plates 13 and 15 form bearing surfaces for the shuttle plate. The shuttle plate is of just a sufficient thickness that only one separator at a time will fall into the opening 26.

Figure 2:
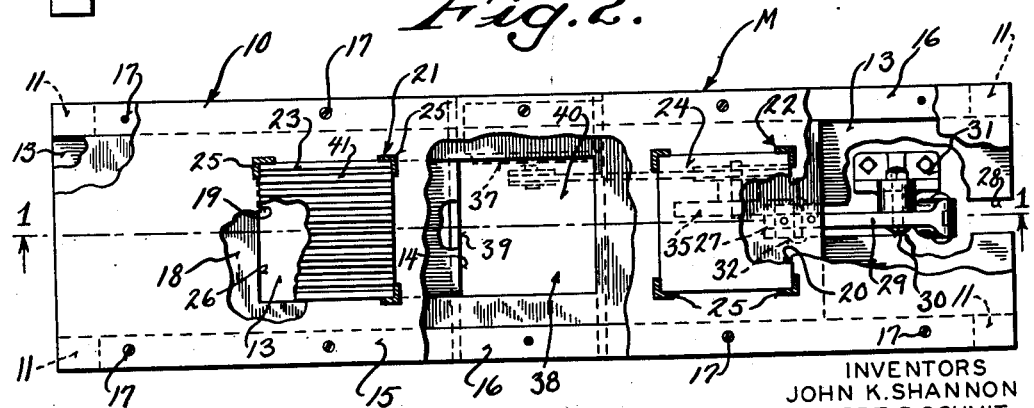
Figure 2 is a horizontal sectional view taken on the line 2—2 of Figure 1, looking in the direction of the arrows.

The shuttle plate 18 can be moved back and forth at the proper and desired speed by any desired type of mechanism and in Figures 1 and 2, we have shown one simple form of means for doing this work. As shown, the shuttle plate has rigidly secured to one end thereof a depending bracket 27, movable in a longitudinal guide slot 28 in the lower plate 13. A double armed lever 29 is rockably mounted adjacent its end on a bearing 30 carried by a bearing bracket 31, which can be secured to the platform 12. The upper arm of the lever 29 is connected by a slot and pin 32 with the bracket 27. The lower arm of the lever has pivotally connected thereto a pitman rod 33, which is operatively connected to the crank pin 34 of a crank wheel 35. The crank wheel 35 is rotatably supported by suitable bearing brackets 36 on the platform 12. The crank wheel can be rotated at the correct speed by any suitable means from an electric motor 37. Obviously, during the rotation of the crank wheel 35, the lever 29 will be rocked back and forth and thus bring about the operation of the shuttle plate.

Supported by the stationary lower plate 13 is a dispensing chute 38, including a pair of spaced parallel side walls 39, which are parallel to the two side walls of the dispensing opening 14. Secured to the side walls 39 is a downwardly and forwardly inclined bottom wall 40, which extends to the front of the machine and this wall 40 terminates at the rear end of the opening 14. The angle of the wall 40 is such that a separator will readily fall down the chute between the side walls 39.

The separators in the stacks 23 and 24 are of the type and character now commonly employed in the manufacture of storage batteries and hence each separator includes a body having spaced parallel ribs 41.

As is clearly shown in Figures 2, 3 and 4, the separators of the stack 23 in the hopper 21 are placed with the ribs 41 uppermost and the separators in the stack 24 in hopper 22 are placed with their ribs 41 lowermost, for a purpose which will now appear.

In the operation of the battery separator dispensing machine, the operator places the separators in the hoppers over the openings 19 and 20, with the ribs of the separators parallel to the longitudinal axis of the table, with one stack of separators with the ribs up and the other stack of separators with the ribs down, as stated. As the shuttle plate 18 travels back and forth, its movement is such that the walls of opening 26 pick up one separator at the extreme ends of its travel from left to right and the shuttle plate carries one separator to opening 14. This separator drops into chute 38 and continues to slide down the chute to a position where it is convenient for a battery plate to be placed against it. Thus, as the shuttle plate 18 moves back and forth, separators with ribs facing alternately in opposite directions are dispensed and positive battery plates may be conveniently placed against separators with the ribs toward the front of the machine and the negative battery plates can be conveniently placed against separators having the smooth side of the separators toward the front of the machine.

In this manner a stack of separators and plates may be formed with alternate plates and separators in proper sequence.

In Figure 6, we have shown a group of battery plates and separators stacked in their proper sequence. The positive plates are indicated by the reference character 42 and negative plates by the numeral 43. The separators with the ribs placed up and down are indicated respectively by their stack numbers 23 and 24.

In some instances glass mats or mats formed from similar material are used in battery construction with the battery plates and separators. Where these mats are used, the chute can be provided with a spaced parallel downwardly inclined wall 44, below the wall 40. This wall 44 is supported by the side walls 39 of the chute and defines an inclined guideway 45 open at its front and back, as is clearly shown in Figure 5. Glass or other mats can be fed by an operator or by a suitable mechanism (not shown) timed with the shuttle plate 18, to the rear end of the guide 45. The glass mat would enter the guide 45, timed with the movement of the shuttle plate 18, so that the glass mat would slide down the chute into position to take its place against the positive plates, so that the ribbed separators would be toward the positive plates, thus forming a stack of separators, glass mats and battery plates stacked in proper sequence.

In the foregoing specification, one preferred means has been illustrated to effectively accomplish the purpose of this invention, but it is to be understood that changes in details may be made, such as the adding of bearings to effect smoother, easier operation and to increase the life of the machine, or construction of the parts may vary somewhat to lessen the cost of manufacture or to strengthen the machine.

What we claim as new is:

A machine for dispensing battery separators with first one separator with its ribs uppermost and the next separator with its ribs lowermost comprising a table including a lower stationary plate, an upper stationary plate, longitudinal spacer strips between said plates at their front and rear portions to define a guideway, said lower plate having a centrally disposed opening of a size at least equal to a separator plate, an inclined chute carried by the lower plate communicating with said opening, said upper plate having spaced openings each of a size at least equal to a separator plate, a hopper carried by the upper plate for receiving a stack of separators with their ribs uppermost disposed over one opening in the upper plate and a second hopper for receiving a stack of separators with their ribs lowermost disposed over the other opening in the upper plate, a shuttle plate reciprocally mounted in the guideway having an opening therein for movement past the openings in the upper plate and the opening in the lower plate for receiving first one separator from one stack and then a separator from the other stack, and means for reciprocating the shuttle plate at an even rate of speed, said chute opening at the front of the machine.

JOHN K. SHANNON.
ROBERT R. SCHMIT.

References Cited in the file of this patent

UNITED STATES PATENTS

| Number | Name | Date |
| --- | --- | --- |
| 1,395,941 | Beattie | Nov. 1, 1921 |
| 1,902,599 | Vernet | Mar. 21, 1933 |
| 1,938,815 | Grenier | Dec. 12, 1933 |
| 2,085,153 | Goretta | June 29, 1937 |
| 2,319,251 | Mittermaier | May 18, 1943 |
| 2,324,523 | Lund | July 20, 1943 |
| 2,436,075 | Orban | Feb. 17, 1948 |